United States Patent
Tsirkin

(10) Patent No.: US 10,552,345 B2
(45) Date of Patent: *Feb. 4, 2020

(54) VIRTUAL MACHINE MEMORY LOCK-DOWN

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,064

(22) Filed: Jan. 2, 2019

(65) Prior Publication Data

US 2019/0155756 A1 May 23, 2019

Related U.S. Application Data

(63) Continuation of application No. 14/951,978, filed on Nov. 25, 2015, now Pat. No. 10,191,858.

(51) Int. Cl.
*G06F 12/14* (2006.01)
*G06F 9/455* (2018.01)

(52) U.S. Cl.
CPC ...... *G06F 12/1441* (2013.01); *G06F 9/45558* (2013.01); *G06F 2009/45575* (2013.01); *G06F 2009/45583* (2013.01); *G06F 2009/45587* (2013.01); *G06F 2212/1052* (2013.01)

(58) Field of Classification Search
CPC .......................... G06F 12/1441; G06F 9/45558
See application file for complete search history.

(56) References Cited

U.S. PATENT DOCUMENTS

| | | |
|---|---|---|
| 8,307,169 B2 | 11/2012 | Elteto |
| 8,341,369 B2 | 12/2012 | Savagaonkar et al. |
| 8,578,483 B2 | 11/2013 | Seshadri et al. |
| 8,694,738 B2 | 4/2014 | Bhattacharjee et al. |
| 8,745,308 B2 | 6/2014 | Chen et al. |
| 8,782,351 B2 | 7/2014 | Arges et al. |
| 9,069,586 B2 | 6/2015 | Dang et al. |
| 9,507,540 B1 | 11/2016 | Adogla et al. |
| 2013/0091318 A1 | 4/2013 | Bhattacharjee et al. |
| 2013/0191924 A1 | 7/2013 | Tedesco et al. |
| 2013/0326179 A1 | 12/2013 | Tsirkin et al. |
| 2015/0268979 A1 | 9/2015 | Komarov et al. |

(Continued)

OTHER PUBLICATIONS

Wang et al., "HyperSafe: A Lightweight Approach to Provide Lifetime Hypervisor Control-Flow Integrity", May 16-19, 2010, North Carolina State University, excerpt from http://oakland31.cs.virginia.edu/slides/HyperSafe.pdf (29 pages).

(Continued)

*Primary Examiner* — Ryan Bertram
*Assistant Examiner* — Edmund H Kwong
(74) *Attorney, Agent, or Firm* — K&L Gates LLP

(57) ABSTRACT

A hypervisor receives, from a guest virtual machine, a request to disable access to a memory range. The hypervisor disables access to the memory range. The hypervisor detects a prohibited access attempt. The prohibited access attempt is an access attempt to the memory range. Responsive to detecting the prohibited access attempt, the hypervisor stops the guest virtual machine. The hypervisor receives a request to reboot the guest virtual machine. The hypervisor reboots the guest virtual machine. Responsive to rebooting the guest virtual machine, the hypervisor enables access to the memory range.

20 Claims, 4 Drawing Sheets

(56) References Cited

U.S. PATENT DOCUMENTS

2016/0170848 A1 6/2016 Yang et al.
2016/0246961 A1 8/2016 Wang

OTHER PUBLICATIONS

Seshadri et al., "SecVisor: A Tiny Hypervisor to Provide Lifetime Kernel Code Integrity for Commodity OSes", Oct. 14-17, 2007, CyLab/CMU Pittsburgh, PA, USA, excerpt from http://www.cs.cmu.edu/~arvinds/pubs/secvisor.pdf (17 pages).
"Security of the VMware vSphere® Hypervisor", Jan. 2014, excerpt from http://www.vmware.com/files/pdf/techpaper/vmw-wp-secrty-vsphr-hyprvsr-uslet-101.pdf (26 pages).
Intel Corporation; Intel® Software Guard Extensions Programming Reference; Oct. 2014; https://software,intel.com/sites/default/fils/managed/48/88/329298-002.pdf; Retrieved Aug. 16, 2018; (186 pages).
Intel Corporation; "Enabling Intel® Virtualization Technology Features and Benefits" 2010; https://www.intel.com/content/dam/www/public/us/en/documents/white-papoers/virtualization-enabling-intel-virtualization-technology-features-and-benefits-paper.pdf; retrieved Aug. 16, 2018; (9 pages).
Dewan, et al; A Hypervisor-Based System for Protecting Software Runtime Memory and Persistent Storage, SpringSim '08, Proceedings of the 2008 Spring simulation multiconference; 2008; (8 pages).
Surendra Anne; KVM: Start/Stop/Save/Restart Guest VM'S in Hypervisor?; https://www.linuxnix.com/kvm-startstopsaverestart-guest-vms-in-hypervisory/; Feb. 27, 2013; (4 Pages.
Technical Whitepaper; "The CPU Scheduler in VMware vSphere 5.1"; Performance Study; 2013; (26 Pages).

VIRTUAL MACHINE MEMORY LOCK-DOWN

CROSS REFERENCES TO RELATED APPLICATIONS

The present application is a continuation of application Ser. No. 14/951,978, filed on Nov. 25, 2015, the entire contents of which are hereby incorporated by reference herein.

BACKGROUND

The present disclosure relates generally to memory management of virtual machines and, more particularly, to virtual machine memory lock-down by a hypervisor. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides new and innovative methods and systems for virtual machine memory lock-down by a hypervisor. For example, the method includes receiving at a hypervisor, from a guest virtual machine, a request to disable access to a memory range. The hypervisor disables access to the memory range. Then, the hypervisor detects a prohibited access attempt, which is an access attempt to the memory range. Responsive to detecting the prohibited access attempt, the hypervisor stops the guest virtual machine. The hypervisor receives a request to reboot the guest virtual machine and reboots the guest virtual machine. Responsive to rebooting the guest virtual machine, the hypervisor enables access to the memory range.

Additional features and advantages of the disclosed methods and system are described in, and will be apparent from, the following Detailed Description and the Figures.

DETAILED DESCRIPTION OF EXAMPLE EMBODIMENTS

Figure 1:
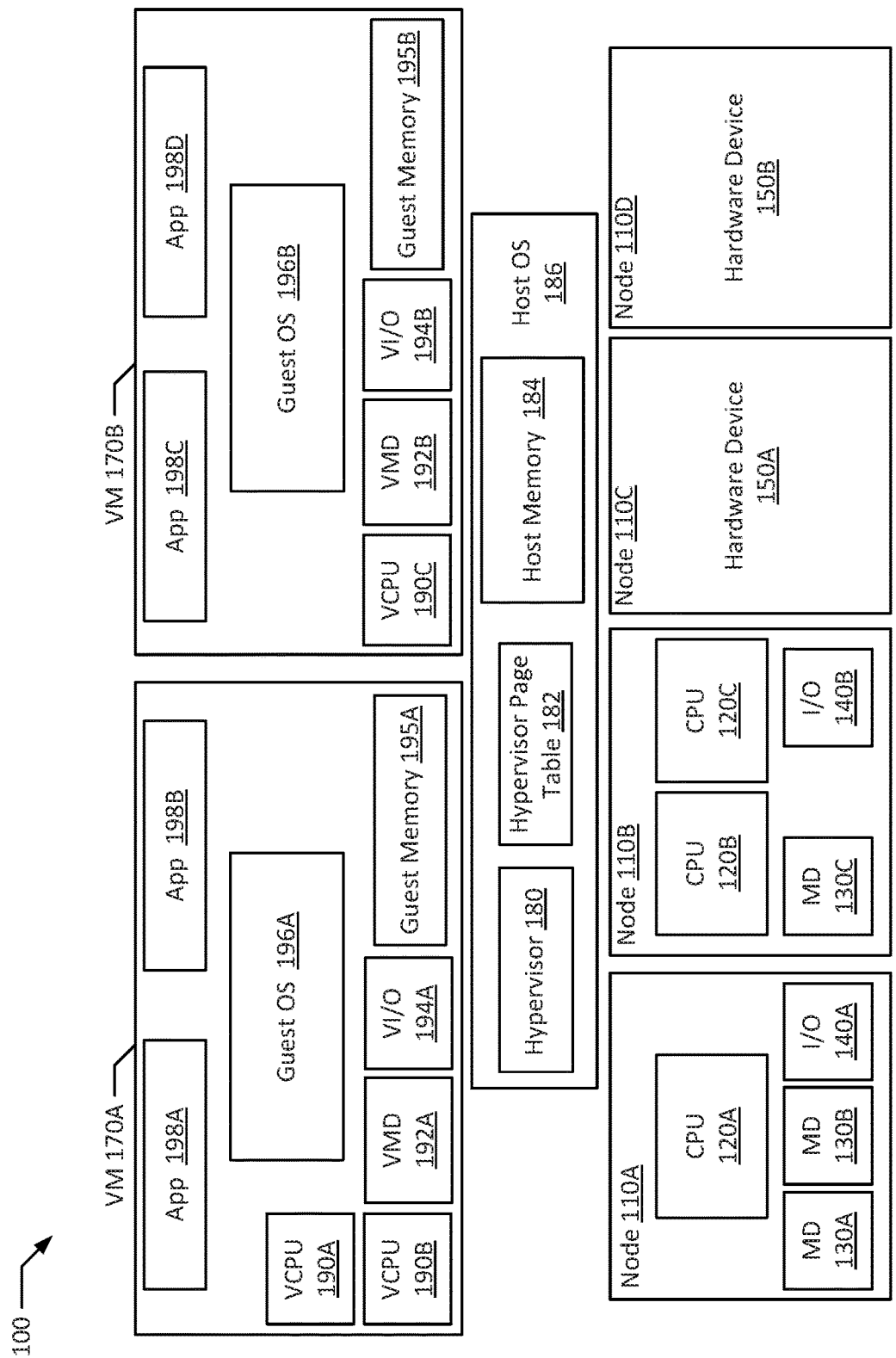
FIG. 1 is a block diagram of an example multi-processor computer system according to an example embodiment of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, input/output device 140A-B refers to a device capable of providing an interface between one or more processors and an external device. The external device's operation is based on the processor inputting and/or outputting data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A, may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device 150A-B.

As noted above, computer system 100 may run multiple guest virtual machines (e.g., VM 170A-B), by executing a software layer (e.g., hypervisor 180) above the hardware and below the guest virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the host operating system 186, or may run directly on the computer system 100 without an operating system beneath it. The hypervisor 180 may virtualize the physical layer, including processors, memory, and I/O devices, and present this virtualization to guest virtual machines 170A-B as devices, including virtual processors (e.g., VCPU 190A-C), virtual memory devices (e.g., VIVID 192A-B), and/or virtual I/O devices (e.g., VI/O 194A-B).

In an example embodiment, a guest virtual machine 170A-B may execute a guest operating system (guest OS) 196A-B which may utilize the underlying VCPU 190A-C, VIVID 192A-B, and VI/O devices 194A-B. One or more applications 198A-D may be running on a guest virtual machine 170A-B under the guest operating system 196A-B. In an example embodiment, a guest virtual machine 170A-B may include multiple virtual processors 190A-C. Processor virtualization may be implemented by the hypervisor 180 scheduling time slots on one or more physical processors 120A-C such that from the guest operating system's perspective those time slots are scheduled on a virtual processor 190A-C.

The hypervisor 180 controls and limits access to memory (e.g., memory allocated to the guest virtual machines 170A-B and memory allocated to the guest operating systems 196A-B, such as guest memory 195A-B provided to guest operating systems 196A-B, etc.). For example, guest memory 195A-B may be divided into a plurality of memory pages. Access to these memory pages is controlled and limited by the hypervisor 180. Likewise, for example, guest memory 195A-B allocated to the guest operating system 196A-B are mapped from host memory 184 such that when a guest application 198A-D uses or accesses a memory page of guest memory 195A-B it is actually using or accessing host memory 184.

The host operating system 186 may include a hypervisor page table 182. The hypervisor page table 182 may record memory access attempts that are made to the host memory 184 of the host operating system 186. In an example embodiment, access attempts to any of the guest memory 195A-B on the guest virtual machines 170A-B or the host memory 184 on the host operating system 186 are made by the nodes 110A-D. For example, any of CPUs 120A-C may attempt to access a portion of memory (e.g., a portion of memory on guest memory 195A of the guest virtual machine 170A). Likewise, for example, any of hardware devices 150A-B may attempt to access a portion of memory (e.g., a portion of memory on guest memory 195A of the guest virtual machine 170A). In a different example embodiment, access attempts to any of the guest memory 195A-B on the guest virtual machines 170A-B or the host memory 184 on the host operating system 186 are made by a malicious actor (e.g., a virus or malicious code on the guest virtual machine 170A). In a related example embodiment, the malicious actor is a virus or malicious code on a virtual device (e.g., VI/O 194A), which can be an emulated device, a paravirtualized device, or an assigned external device.

Mappings may be used together with any paging data structure used by the guest virtual machines 170A-B to support translation from guest operating system 196A-B to host operating system 186 (e.g., 32-bit linear address space using a two-level hierarchical paging structure, Physical Address Extension mode, INTEL® Extended Memory 64 Technology mode, etc.).

Figure 2:
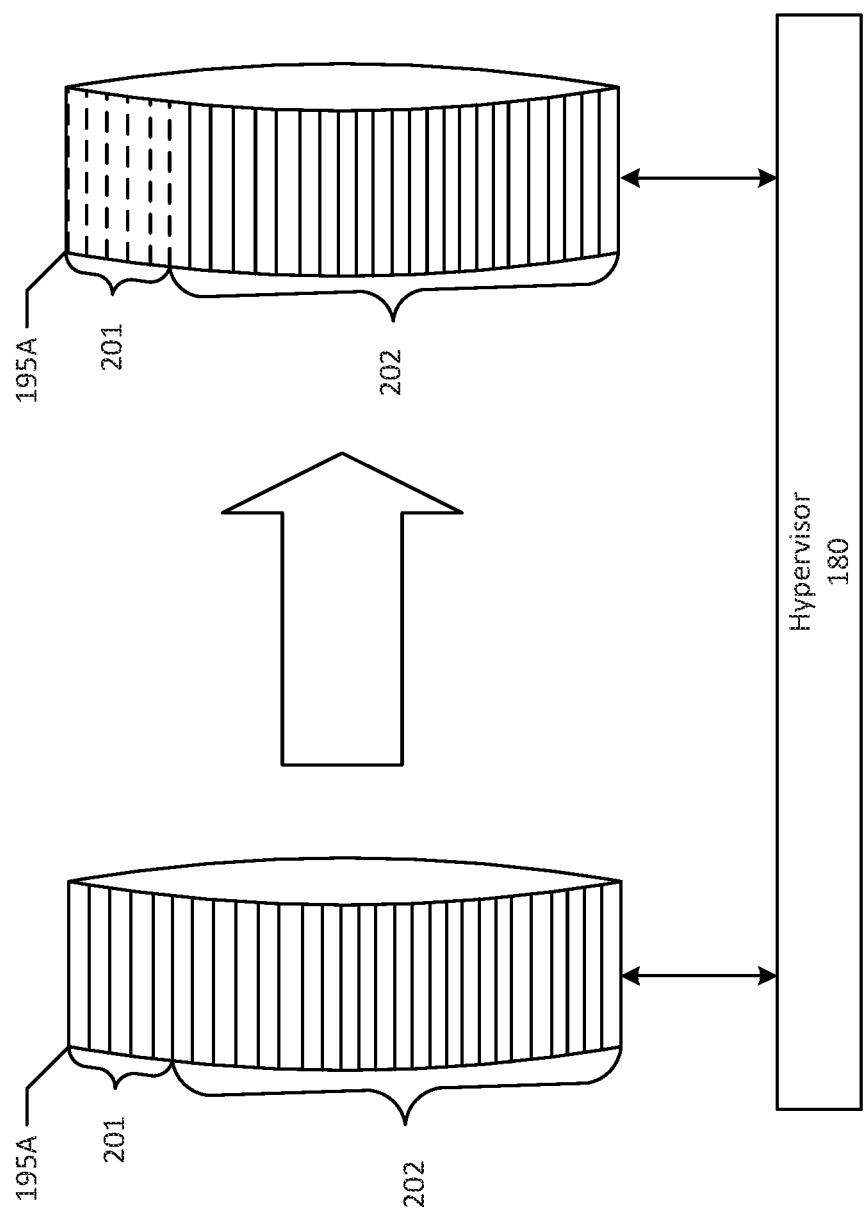
FIG. 2 is a block diagram illustrating virtual machine memory lock-down by a hypervisor according to an example embodiment of the present disclosure.

FIG. 2 is a block diagram illustrating virtual machine memory lock-down by a hypervisor according to an example embodiment of the present disclosure. Virtual machine memory lock-down may be intended to prevent pages of a portion of main memory, or a memory range, from being inappropriately accessed, modified, executed, etc. Such a request, to lock-down a memory range of the virtual machine, may be submitted, for example, when the guest operating system 196A stores, or intends to store, a secure datum (e.g., a password, a private encryption key, etc.) in main memory (e.g., guest memory 195A). By locking-down a memory range, the hypervisor 180 ensures that the secure datum is not accessible by a malicious actor (e.g., a virus or malicious code on the guest virtual machine 170A, on a virtual device 194A, etc.). For example, the memory range 201 may be set to write protect type, which may advantageously guard against attacks by malware, for example, that can only manipulate small amounts of memory at a time (e.g., single bit flip manipulation). Thus, by locking-down the guest virtual machine 170A, the hypervisor 180 detects access from within the guest virtual machine 170A that violates the rules set by the guest virtual machine 170A.

The guest memory 195A includes a plurality of discrete physical locations in memory. For example, guest memory 195A may include a memory range 201 that is desired to be locked down and other memory 202; however, in a different example, memory range 201 may include all of guest memory 195A. The memory range 201 may be related to any number of different storage characteristics associated with computer system 100. In an example embodiment, the memory range 201 is related to kernel memory. In a different example embodiment, the memory range 201 is related to a hypervisor page table 182. In a different example embodiment, the memory range 201 is related to a register. In a different example embodiment, the memory range 201 is related to an interrupt vector table.

Initially, the both the memory range 201 and other memory 202 are accessible by the guest operating system 196A of the guest virtual machine 170A as noted by the solid lines at the guest memory 195A. The hypervisor 180 receives a request from a guest virtual machine (e.g., guest virtual machine 170A) to lock-down a memory range (e.g., the memory range 201). Responsive to receiving this request, the hypervisor 180 locks-down the memory range (e.g., memory range 201), such that the memory range is not accessible by the guest operating system of the guest virtual machine (e.g., guest operating system 196A of guest virtual machine 170A) as noted by the dotted lines. Likewise, the memory range 201 is not accessible by virtual devices, such as VI/O 194A that is within the guest virtual machine 170A. The process of locking-down a memory range of the guest virtual machine 170A, by the hypervisor 180, is described in greater detail with reference to FIGS. 3 and 4.

Figure 3:
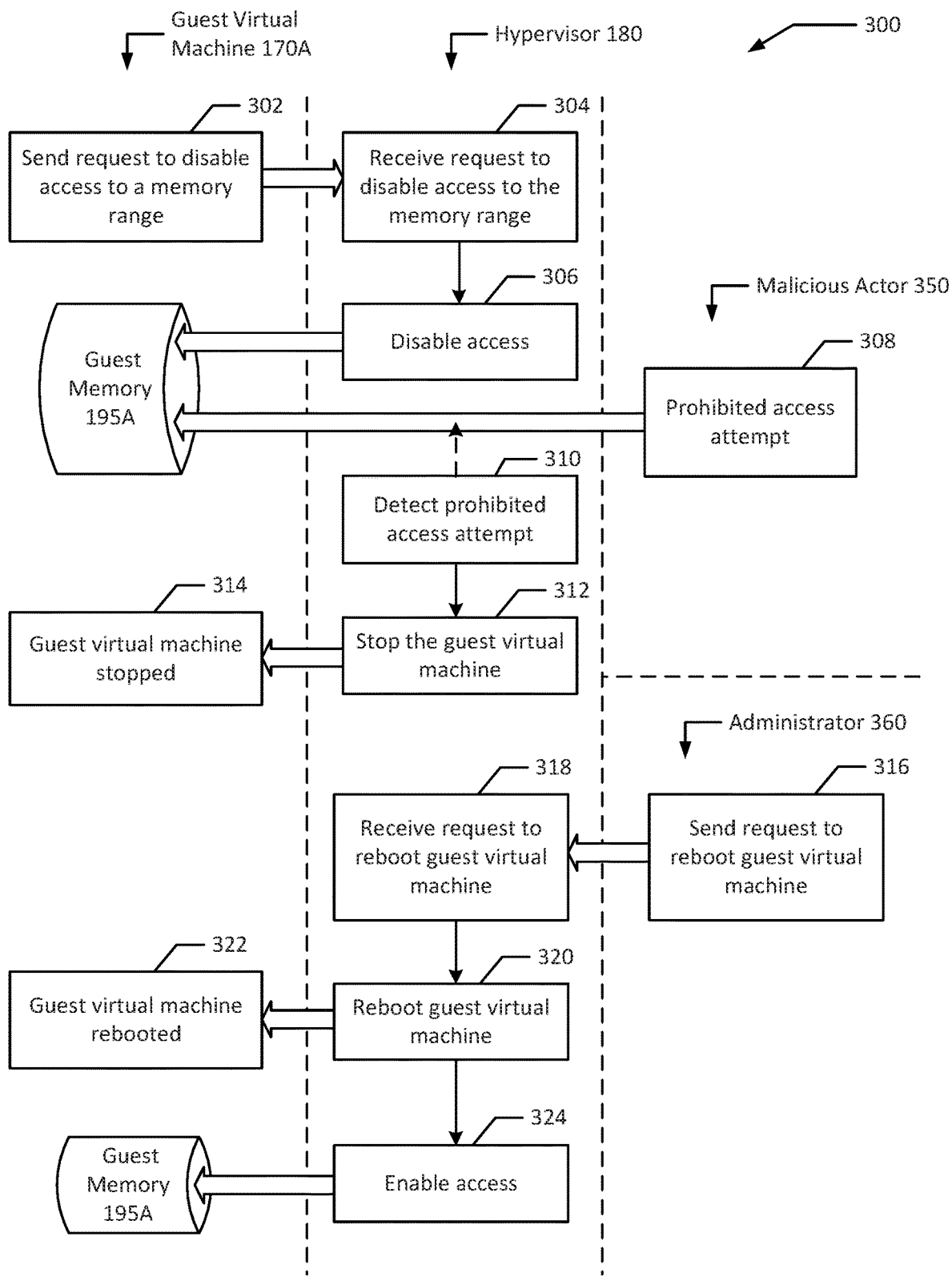
FIG. 3 is a flow diagram illustrating an example method of virtual machine memory lock-down by a hypervisor according to an example embodiment of the present disclosure.

FIG. 3 is a flow diagram illustrating an example method of virtual machine memory lock-down by hypervisor according to an example embodiment of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both.

In the illustrated example embodiment, the hypervisor 180 is in communication with the guest virtual machine 170A. In alternate example embodiments, the hypervisor 180 is in communication with one or more other virtual machines (e.g., virtual machine 170B), applications (e.g., applications 198A-D), virtual processors (e.g., VCPU 190A-C), virtual memory devices (e.g., VIVID 192A-B), and/or virtual I/O devices (e.g., VI/O 194A-B). The guest virtual machine 170A sends a request to disable access to a memory range 201 (block 302). The hypervisor 180 receives, from the guest virtual machine 170A, the request to disable access to the memory range 201 (block 304). The memory range 201 is at least a portion of memory of the guest virtual machine 170A (e.g., at least a portion of guest memory 195A). In an example embodiment, guest memory 195A contains a secure datum (e.g., a password, a private encryption key, etc.). The guest virtual machine 170A may store the secure datum in a location of guest memory 195A that is allocated to the guest virtual machine 170A. For example, the secure datum is stored in the first memory range 201 of the guest memory 195A. In example embodiments, the memory range 201, which is disabled by the hypervisor 180, may be all of the guest memory 195A that is allocated to the guest virtual machine 170A, or may be a subset of memory that is allocated to guest virtual machine 170A. As described above, the guest virtual machine 170A sends the request to disable access to the memory range 201 (block 302). In a different example embodiment, the request to disable access to the memory range 201 may be initiated by an application executing within guest virtual machine 170A, and may be forwarded by guest operating system 196A to the hypervisor 180.

Upon receiving a request to disable access to the memory range 201 (block 304), the hypervisor 180 disables access to the memory range 201, which is a portion of the guest memory 195A on the guest virtual machine 170A (block 306). By disabling access to the memory range 201, the hypervisor 180 locks-down the memory range 201 of the guest memory 195A, so that none of the pages of the portion of memory in the memory range 201 are inappropriately accessed, modified, executed, etc. In example embodiments, disabling access to the memory range includes restricting the memory range to one of write protect type, read protect type, write-and-read protect type, and execute protect type.

A prohibited access attempt is made by a malicious actor 350 (block 308). The prohibited access attempt is an attempt to access at least a portion of the memory range 201 (e.g., at least one page from the memory range 201) of the guest memory 195A that has been locked down (e.g., access disabled) by the hypervisor 180. In example embodiments, access attempts may include attempts to access data, read data, write data, copy data, migrate data, etc. In an example embodiment, the malicious actor 350 is a virus or malicious code on the guest virtual machine 170A. In a related example embodiment, the malicious actor is a virus or malicious code on a virtual device (e.g., VI/O 194A), which can be an emulated device, a paravirtualized device, or an assigned external device.

The hypervisor 180 detects the prohibited access attempt (block 310). In an example embodiment, the hypervisor 180 may additionally record the prohibited access attempt in a hypervisor page table 182. In a different example embodiment, the hypervisor 180 may additionally record the prohibited access attempt in a log data structure of the hypervisor 180. Through use of the hypervisor page table 182, or the log data structure, the hypervisor 180 may keep track of all prohibited access attempts. This may be especially useful to an administrator 360. For example, the administrator 360 may identify if particular data are at risk for prohibited access attempts, if particular malicious actors (e.g., malicious actor 350) are continually making prohibited access attempts, etc. Responsive to detecting the prohibited access attempt, the hypervisor 180 stops the guest virtual machine 170A (block 312). Stopping the guest virtual machine 170A (block 314) may prevent the malicious actor 350 from accessing any data in the memory range 201. In an example embodiment, stopping the guest virtual machine 170A (block 314) includes crashing a virtual CPU (e.g., VCPU 190A) by triggering an uninhabitable event. In a different example embodiment, stopping the guest virtual machine 170A (block 314) includes sending interrupts to all CPUs (e.g., CPUs 120A-C) that are running the guest virtual machine 170A. In an example embodiment, the guest virtual machine 170A may remain stopped until the administrator 360 dictates otherwise.

In an example embodiment, responsive to stopping the guest virtual machine 170A (block 314), the hypervisor 180 may take a protective action. In one example embodiment, the protective action may include notifying the administrator 360 of the prohibited access attempt. In a different example embodiment, the protective action may include creating a snapshot of the guest virtual machine 170A. In a different example embodiment, the protective action may include destroying the guest virtual machine 170A. In a different example embodiment, the protective action may include starting a new guest virtual machine. In a different example embodiment, the protective action may include a number of separate and different protective actions, for example, as described above.

The administrator 360 sends a request to reboot the guest virtual machine (block 316). The hypervisor 180 receives the request to reboot the guest virtual machine 170A (block 318), from the administrator 360. In an example embodiment, the administrator 360 is related to the host operating system 186 of computer system 100. In a different example embodiment, the administrator 360 is external to computer system 100. In an alternate example embodiment, a request to reboot the guest virtual machine 170A may be generated from within the guest virtual machine 170A (e.g., generated by a virtual CPU). For example, if stopping the guest virtual machine 170A includes crashing a virtual CPU (e.g., VCPU 190A), another virtual CPU (e.g., VCPU 190B) may send the request to reboot the guest virtual machine 170A. In an alternate example embodiment, a request to reboot the guest virtual machine 170A may be generated by the hypervisor 180. In an alternate example embodiment, a request to reboot the guest virtual machine 170A may be automatically generated upon detection of the prohibited access attempt (block 310), such that stopping the guest virtual machine 170A includes rebooting the guest virtual machine 170A (block 320). In this example embodiment, because the guest virtual machine 170A is automatically rebooted, no request to reboot the guest virtual machine 170A is required.

The hypervisor reboots the guest virtual machine (block 320). When the guest virtual machine 170A is rebooted (block 322), the hypervisor 180 enables access to the memory range 201 (block 324) of guest memory 195A on the guest virtual machine 170A. By enabling access to the memory range, the hypervisor 180 unlocks the memory range 201, such that the pages of memory in the memory range 201 may be accessed, modified, executed, etc.

Figure 4:
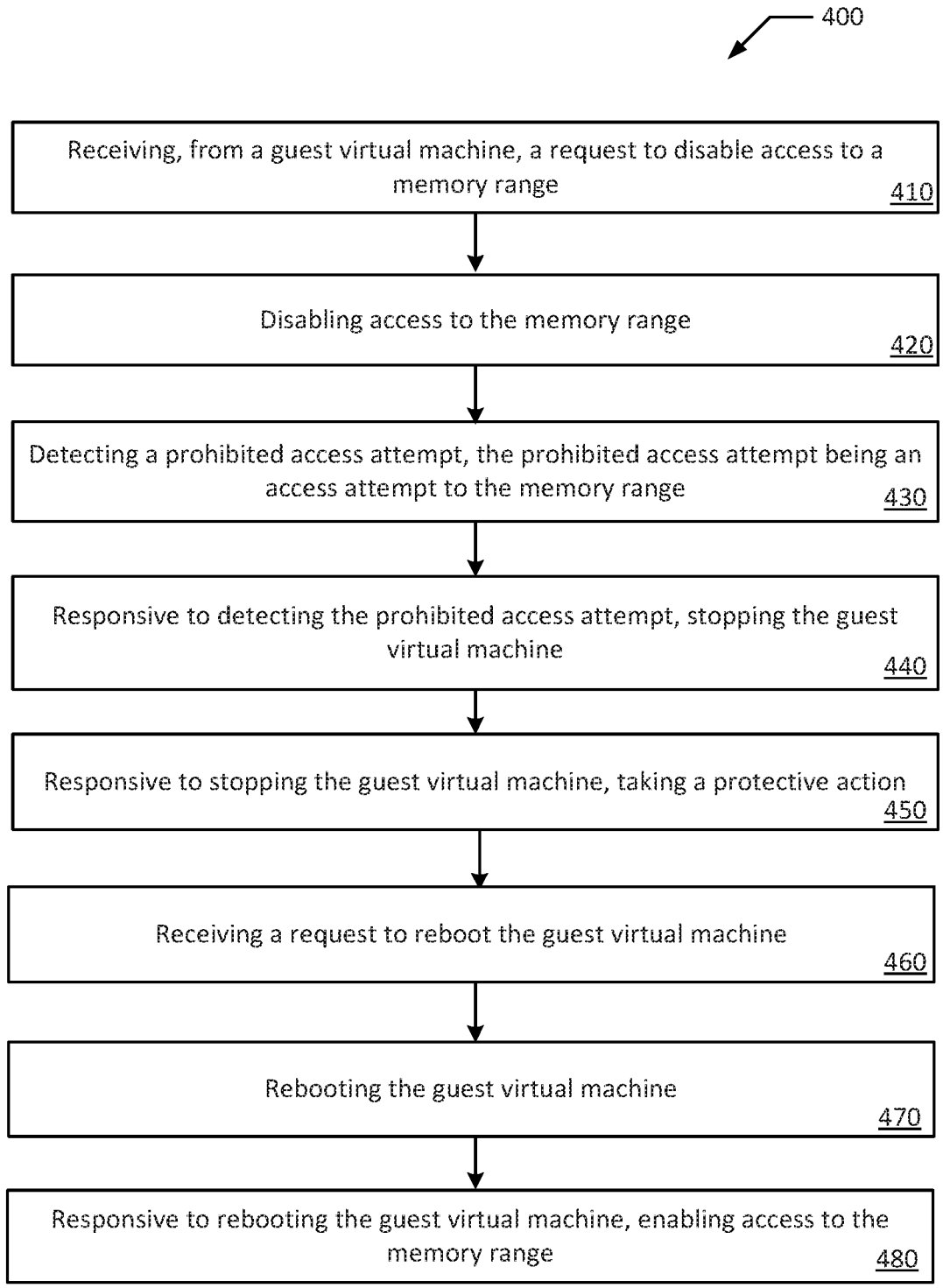
FIG. 4 is a flowchart illustrating an example method of virtual machine memory lock-down according to an example embodiment of the present disclosure.

FIG. 4 is a flowchart illustrating an example method of virtual machine memory lock-down according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. In an example embodiment, the method is performed by a hypervisor 180 and a guest virtual machine (e.g., 170A).

The example method 400 starts with a hypervisor 180 receiving, from a guest virtual machine 170A, a request to disable access to a memory range 201 (block 410). The example method 400 continues by disabling access to the memory range 201 (block 420). In an example embodiment, by disabling access, the hypervisor may restrict the memory range 201 to one of write protect type, read protect type, write-and-read protect type, and execute protect type. For example, the memory range 201 may include kernel page tables that are set to write protect type, which may advantageously guard against attacks by malware, for example, that can only manipulate small amounts of memory at a time. Likewise, for example, kernel page tables that are set to write protect type may advantageously guard against attacks by malware that has gained access to kernel memory after protections have already been set up.

The hypervisor 180 then detects a prohibited access attempt, the prohibited access attempt being an access attempt to the memory range 201 (block 430). In an example embodiment, this access attempt is made by a malicious actor 350. In an example embodiment, the malicious actor is a virus or malicious code on the guest virtual machine 170A. In a related example embodiment, the malicious actor is a virus or malicious code on a virtual device (e.g., VI/O 194A), which can be an emulated device, a paravirtualized device, or an assigned external device. Responsive to detecting the prohibited access attempt, the hypervisor 180 stops the guest virtual machine 170A (block 440). Furthermore, responsive to stopping the guest virtual machine 170A, the hypervisor 180 may take a protective action (block 450). In an example embodiment, the protective action may include notifying an administrator 360 of the prohibited access attempt. In a different example embodiment, the protective action may include creating a snapshot of the guest virtual machine 170A. In a different example embodiment, the protective action may include destroying the guest virtual machine 170A. In a different example embodiment, the protective action may include starting a new guest virtual machine. In a different example embodiment, the protective action may include a number of separate and different protective actions, as described above.

The hypervisor 180 receives a request to reboot the guest virtual machine 170A (block 460). In an example embodiment, the request to reboot is sent by the administrator 360. The hypervisor 180 may then reboot the guest virtual machine 170A (block 470). Responsive to rebooting the guest virtual machine 170A, the hypervisor 180 enables access to the memory range 201. For example, the hypervisor unlocks the memory range 201, so that pages of memory in the memory range 201 may be accessed, modified, executed, etc. In example embodiments, enabling access to the memory range includes removing restrictions on write protect type, read protect type, write-and-read protect type, and execute protect type.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of memory lock-down, the method comprising:
   storing, by a guest virtual machine, a secure datum at a location within a memory range;
   responsive to storing the secure datum, sending, by the guest virtual machine, a request to disable access to the memory range;
   receiving, by a hypervisor from the guest virtual machine, the request to disable access to the memory range;
   disabling, by the hypervisor, access to the memory range;
   detecting, by the hypervisor, a prohibited access attempt, wherein the prohibited access attempt is an access attempt to the memory range;
   receiving, by the hypervisor, a request to reboot the guest virtual machine;
   rebooting, by the hypervisor, the guest virtual machine; and
   responsive to rebooting the guest virtual machine, enabling, by the hypervisor, access to the memory range.

2. The method of claim 1, wherein disabling access to the memory range includes restricting the memory range to one of write protect type, read protect type, write-and-read protect type, and execute protect type.

3. The method of claim 1, wherein the memory range is related to one of kernel memory, a hypervisor page table, a register, and an interrupt vector table.

4. The method of claim 1, wherein the prohibited access attempt is recorded in a hypervisor page table.

5. The method of claim 1, further comprising, responsive to detecting the prohibited access attempt, crashing a virtual CPU by triggering an uninhabitable event.

6. The method of claim 1, further comprising, responsive to detecting the prohibited access attempt, sending interrupts to all CPUs that are running the guest virtual machine.

7. The method of claim 1, further comprising, responsive to detecting the prohibited access attempt, taking a protective action.

8. The method of claim 7, wherein the protective action includes notifying an administrator.

9. The method of claim 7, wherein the protective action includes creating a guest virtual machine snapshot.

10. The method of claim 7, wherein the protective action includes destroying the guest virtual machine.

11. The method of claim 7, wherein the protective action includes starting a new guest virtual machine.

12. The method of claim 1, wherein the request to reboot the guest virtual machine is received from an administrator.

13. The method of claim 1, wherein the request to reboot the guest virtual machine is automatically generated upon destruction of the guest virtual machine.

14. The method of claim 1, wherein the guest virtual machine has an assigned device and access to the memory range is disabled for the assigned device.

15. A computer-readable non-transitory storage medium comprising executable instructions that, when executed, are configured to cause a hypervisor to:
   receive a lock-down request from a guest virtual machine, wherein the lockdown request is sent by the guest virtual machine in response to storage, by the guest virtual machine, of a secure datum at a location within a memory range;
   disable access to the memory range associated with the lock-down request;
   detect an access attempt to the memory range;
   receive a reboot request for the guest virtual machine;
   reboot the guest virtual machine; and
   responsive to rebooting the guest virtual machine, enable access to the memory range associated with the lock-down request.

16. A system comprising:
   a memory;
   one or more processors, in communication with the memory;
   a guest virtual machine, configured to execute on the one or more processors to store a secure datum at a location within a memory range, and responsive to storing the secure datum, send a request to disable access to the memory range; and
   a hypervisor, configured to execute on the one or more processors, to:
      receive, from the guest virtual machine, the request to disable access to the memory range;
      disable access to the memory range;
      detect a prohibited access attempt, wherein the prohibited access attempt is an access attempt to the memory range;
      receive a request to reboot the guest virtual machine;
      reboot the guest virtual machine; and
      responsive to rebooting the guest virtual machine, enable access to the memory range.

17. The system of claim 16, wherein the memory range is related to kernel memory.

18. The system of claim 16, wherein the memory range is related to a hypervisor page table.

19. The system of claim 16, wherein the memory range is related to a register.

20. The system of claim 16, wherein the memory range is related to an interrupt vector table.

* * * * *